United States Patent Office 2,805,181
Patented Sept. 3, 1957

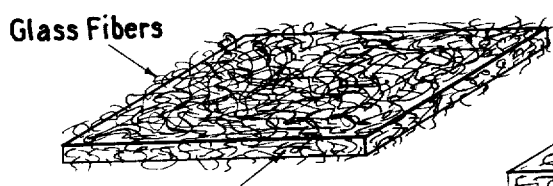
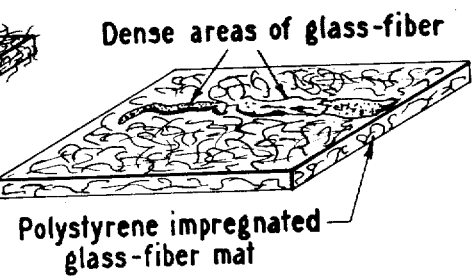
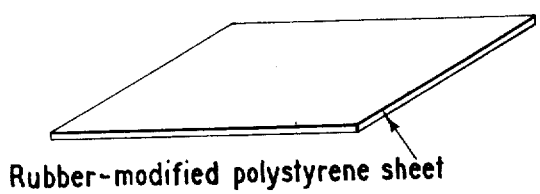
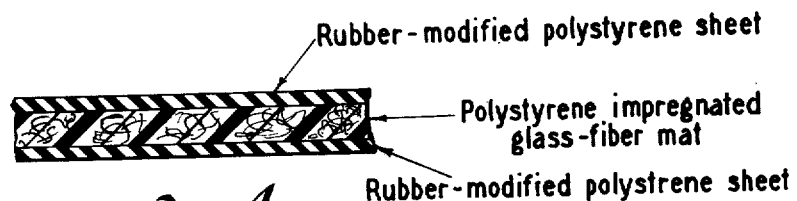
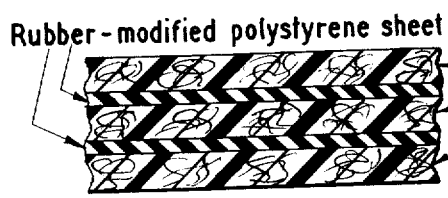
INVENTORS
FRAZIER GROFF
CARLO F. MARTINO

2,805,181

THERMOPLASTIC LAMINATE

Frazier Groff, Plainfield, and Carlo F. Martino, Somerville, N. J., assignors to Union Carbide Corporation, a corporation of New York Application September 3, 1953, Serial No. 378,188

15 Claims. (Cl. 154—43)

This invention relates to a new type of laminate comprising sheets of polystyrene impregnated Fiberglas mat and of rubber-modified polystyrene compressed together, and having new and desirable qualities and properties.

In the past few years, the use of glass-fiber mats as structural members and in many other applications has increased greatly. It is well known in the art to form large sheets of glass-fiber mats by impregnating the glass fibers with plastic to form a hard and solid sheet. It is also known in the art to combine a number of such sheets in a laminate.

Such sheets and laminates of glass-fiber can be used as sheets or formed into desired shapes either at the time of lamination or with certain types of plastic fillers, after lamination is complete. Such a glass cloth laminate is lighter than an equivalent section of the lightest structural alloy, and yet is stronger than a section of structural steel of similar size. The above-enumerated properties thus make glass-fiber laminates quite desirable for a number of uses.

However, certain undesirable properties of glass-fiber laminates and difficulties in the process of lamination restrict their use in many applications where they would otherwise be quite suitable and satisfactory. For example, a distinct disadvantage of glass-fiber laminates is the texture and appearance. It is quite difficult to get a smooth surface and the glass fibers can readily be seen even when a relatively smooth surface is attained.

Another disadvantage is that the density of a sheet of plastic impregnated glass-fiber varies significantly throughout the sheet. It is necessary to employ excessively high pressures to offset these density variations and under high pressures, the laminate flows unevenly, thickness control is difficult, and there is significant loss of material in trimming the edges. The glass-fiber mat offers considerable resistance to lateral plastic movement during the pressing operation. When there is excessive uneven flow of the glass-fiber sheet, its structure is destroyed and the strength of the composite is weakened.

An object of the present invention is the production of a glass-fiber laminate free from the disadvantages normally associated with such products and, in addition, having distinct advantages of its own. Specifically, it is an object of this invention to produce a laminate having a smooth surface pleasing to the eye, uniform density, and high impact strength. Another is to produce a laminate having good dimensional stability over a wide range of temperatures, including temperatures as low as —100° C.

According to our invention, sheets of glass-fiber mat which have been impregnated with polystyrene are laminated under heat and pressure with sheets of rubber-modified polystyrene. The number of sheets used can be varied according to the strength and thickness desired, and sheets of polystyrene impregnated glass-fiber and of rubber-modified polystyrene are usually alternated in the laminate. In multiple laminates, the outer sheets of rubber-modified polystyrene may be of different thicknesses than the inner layers.

The drawing serves to illustrate the components of the invention, and some of the ways in which they can be combined to form the laminate of the invention.

Figure 1 shows a glass-fiber mat before impregnation.

Figure 2 shows a polystyrene impregnated mat and illustrates the dense areas which cause a non-uniform thickness throughout the sheet.

Figure 3 shows a rubber-modified polystyrene sheet.

Figure 4 is a cross-section through a typical laminate of the invention comprising an inner sheet of polystyrene impregnated mat covered by two outer sheets of rubber-modified polystyrene sheet.

Figure 5 shows the lamination of three sheets of rubber-modified polystyrene separated by two sheets of polystyrene impregnated glass-fiber mat.

Figure 6 shows a laminate formed by alternating two sheets of rubber-modified polystyrene with two sheets of polystyrene impregnated glass-fiber mat.

Figure 7 shows the lamination of three sheets of polystyrene impregnated glass-fiber mat separated by two sheets of rubber-modified polystyrene.

As stated above, this invention involves the combination of a polystyrene impregnated glass-fiber mat and a sheet of rubber-modified polystyrene. The glass-fiber mat may be impregnated with from 50 to 85 percent polystyrene by weight, with a content of 60 to 70 percent by weight being preferred for most applications. A higher percentage of glass-fiber in the mat will mean a greater resistance to heat distortion at high temperatures. The thickness of the impregnated mat will depend mainly on the thickness of the untreated glass-fiber matting used. This will ordinarily have a weight of 1½ to 4 ounces (on a pounds per square foot basis), with a two ounce weight being preferred for most applications. After treatment with the polystyrene emulsion, the impregnated mat will usually have a thickness of 60 to 100 mils.

The polystyrene used in the invention is emulsion polymerized polystyrene having an average molecular weight of from 50,000 to 200,000 as determined by the Staudinger viscosity method. The polystyrene emulsion may contain from 30 to 50 percent solids with 40 percent being preferred. It is made in the conventional manner by emulsifying styrene in water and then polymerizing by heating. The usual emulsifiers may be used, such as the sodium salts of the higher fatty acids (stearates), of rosin acids, and of alkyl aryl sulfonates. The original glass-fiber mat used for impregnation consists of glass fibers lightly bonded with five to six percent by weight of polystyrene. After treatment by impregnation with the polystyrene emulsion described above, the impregnated glass-fiber mat is dried and is then ready for use in the invention.

Where the outer sheet of the laminate is of rubber-modified polystyrene and is intended to hide the glass fibers in the impregnated glass-fiber mat, the rubber-modified polystyrene sheet should be at least 20 mils in thickness. An inner layer of rubber-modified polystyrene, serving to compensate for the unevenness of the impregnated glass-fiber mat and provide for flow, can be varied in thickness as necessary for the particular application, but is usually from 5 to 20 mils in thickness.

The rubber-modified polystyrene which forms one layer of the laminate can be made in one of several ways. The preferred method is as follows: A styrene emulsion is made up in the usual manner by emulsifying styrene in water, using the common emulsifiers such as the sodium salts of the higher fatty acids (stearates), of the rosin acids and of alkyl aryl sulfonates. The emulsion thus prepared is then mixed with a rubber emulsion of the type known commercially as GRS–V. GRS–V is a water emulsion of a copolymer of butadiene and styrene, with approximately 30 percent by weight of the hydrocarbon present being derived from styrene and a solids content of about 58 percent by weight. After mixing, the two emulsions are heated with agitation and under reflux at temperatures of from 80 to 90° C., which procedure is known as "consecutive polymerization." It is believed that part of the styrene becomes chemically combined as side chains on the rubber while the remaining styrene is polymerized to polystyrene. The styrene emulsion and the synthetic rubber emulsion are usually mixed in such proportions that, of the hydrocarbon present in the final polymeric product, from 5 to 30 percent by weight of the total is derived from butadiene and from 70 to 95 percent by weight from polystyrene. Optional types of rubber which can be used include those copolymers of butadiene and styrene in which of the total hydrocarbon present approximately 0 to 50 percent by weight is derived from styrene.

According to a second suitable method, a styrene emulsion is made in the manner described above and then this emulsion is polymerized, usually in the presence of a polymerization catalyst, and at a temperature of from 60 to 90° C. The polystyrene emulsion which results is then mixed with a rubber latex such as the aforementioned GRS–V, and the mixture is coagulated by conventional means. The precipitate is then filtered off and dried.

In neither method is it necessary in the first emulsion mixture to use the emulsions in the proportions required to give the final composition required. For example, in the first method, the styrene and rubber emulsions may be mixed and polymerized in such proportions that the hydrocarbon present in the polymer when precipitated will be approximately 50 percent by weight derived from butadiene and 50 percent by weight derived from styrene. Then, prior to precipitation, there can be added a sufficient amount of a polystyrene latex so that when the mixed latices are precipitated, more than 50 percent of the hydrocarbon present in the final product will be derived from styrene. Or, as another alternative, upon completion of the polymerization of the mixed emulsions by either of the above methods, the reaction product may be precipitated and dried and the dried product may be compounded with an additional amount of polystyrene, by either kneading or milling at a temperature of about 170° C.

There are several other variations in the types of materials suitable for use in the invention. Instead of employing a polystyrene emulsion as the impregnant for the glass-fiber, it is possible to use as the impregnant an emulsion of the copolymer of styrene and acrylonitrile, with a 70 percent styrene–30 percent acrylonitrile copolymer being preferred.

As another alternative, the rubber component may be prepared by first employing any of the above methods, and using acrylonitrile in addition to the styrene component, as for example by reacting an emulsion of a styrene and acrylonitrile mixture with a styrene-butadiene rubber latex and precipitating and drying the reaction product by conventional means. This reaction product may be blended, if desired, with more of the styrene-acrylonitrile copolymer, either by adding a styrene-acrylonitrile copolymer latex before precipitation and then precipitating the mixed latices together or by compounding the dried reaction product after precipitation with styrene-acrylonitrile copolymer either by milling or by kneading them together. The final rubber component produced by any of the above methods may be processed into sheet form for use in the laminate by either a pressing, calendering or extruding process.

Laminates made according to this invention are characterized by excellent dimensional stability, a high heat distortion temperature, high impact strength virtually unaffected by temperatures as low as −100° C. and a smooth, glossy appearance. After lamination, the rubber-modified polystyrene outer sheets of the laminate have a hard, smooth, glossy finish and the glass fibers are practically invisible, it being possible to vaguely see their outlines only when light strikes the sheet from specific angles.

In the laminates made according to this invention, the interlayers of rubber-modified polystyrene flow laterally and compensate for the variations in density of the sheets of polystyrene impregnated glass-fiber. Hence, in laminates of this new type, there is good dimensional control and little flow in the glass-fiber sheet or mat. Thus, it is possible to produce large sheets free of low density areas with relatively low pressures during the laminating and with relatively slight loss of material in the edge trim.

Another important advantage of the invention is that during exposure to high temperatures, the laminate of the invention does not shrink or distort in handling. This property of the laminate is not only highly desirable, but is surprising in view of the fact that the rubber component by itself does show considerable shrinkage, as is evident from Table 2.

The many advantages of composite laminates made according to this invention also show their promise as substitutes for metal in applications which can easily be made by post forming. The laminate of the invention can be post formed in the conventional manner, as now applied to polystyrene impregnated glass-fiber.

The following examples illustrate various ways in which this invention may be practiced.

EXAMPLE I

Two squares of block rubber-plasticized polystyrene, measuring six inches by six inches by 0.025 inch, were placed on either side of a six inch sheet of polystyrene impregnated glass-fiber. The rubber-modified sheet was made by emulsifying styrene in water in the usual manner to produce a styrene emulsion containing about 50 percent solids by weight. Forty parts by weight of this emulsion was mixed with about 80 parts by weight of an emulsion of a copolymer of 70 percent butadiene and 30 percent styrene containing 60 percent solids by weight. The mixture was heated to between 80 and 90° C., potassium persulphate was added as a catalyst, and the mixture was then polymerized. The resulting polymer was recoverd by coagulation, precipitated and dried. Of the hydrocarbon present in this dried polymer, approximately 50 percent by weight was derived from styrene and 50 percent from butadiene. Sixty parts by weight of this dried product was then compounded with 80 parts by weight of polystyrene having a molecular weight of from 70,000 to 80,000 (Staudinger viscosity) by milling at about 170° to 180° C. The resulting composition was then calendered to a uniform sheet of about 0.025 inch thickness.

The polystyrene impregnated mat was made in the following manner. A sheet of glass-fiber mat consisting of glass fibers bonded together by about 5% by weight of polystyrene and weighing 2 ounces per square foot was impregnated with 4.67 ounces of emulsion polymerized polystyrene (70 percent by weight). The emulsion polymerized polystyrene, which had a molecular weight of between 50,000 and 200,000, was prepared in the conventional manner by emulsifying styrene in water with one of the usual emulsifying agents and then polymerizing by heating.

The two sheets of impregnated glass-fiber mat and the sheet of polystyrene between them were then laminated together in a "Preco" press as follows. The materials were preheated at platen temperatures of 150° C. for 5 minutes, 335 p. s. i. platen pressure was then applied for 15 minutes, and afterwards the platens were cooled to room temperature while the platen pressure was maintained at 335 p. s. i.

The rubber-plasticized polystyrene sheet adhered well to the polystyrene impregnated mat and hid the glass fibers in the mat well. Except for a very slightly noticeable outline of glass fibers in the rubber-plasticized sheet when the laminate was held at certain angles, no fibers could be seen. The surface of the resulting laminate was smooth and glossy, and the laminate itself was flat indicating that possible differences in the coefficient of expansion had been balanced. The laminate was tough.

EXAMPLE II

A laminate consisting of three sheets of five inch by five inch by 0.025 inch sheets of black, extruded, rubber-modified polystyrene, made in the manner of Example I, and separated by two five inch by five inch sheets of polystyrene impregnated glass-fiber, made according to Example I, was made up in a "Preco" press. The materials were preheated at platen temperatures of 150° C. for 5 minutes, 300 p. s. i. platen pressure was then applied for 10 minutes, and afterward the platens were cooled to room temperature while the pressure was maintained at 300 p. s. i. The resulting laminate was flat, smooth and glossy. In addition, the various components of the laminate were strongly bonded together and the glass fibers in the mat were not noticeable.

EXAMPLE III

Large scale production equipment was successfully used to laminate together twenty inch by forty inch sheets by 0.25 sheets of calendered and extruded sheets of rubber-modified polystyrene, made according to Example I, and twenty inch by forty inch by 0.025 inch sheets of polystyrene impregnated glass-fiber mat made according to Example I. The laminates, which ranged in thickness from .080 inch to .240 inch, consisted of two, three, four and five sheets of the rubber-modified polystyrene, each of which was separated from the others by a sheet of the mat. No production difficulties were encountered, and as expected, the components of the laminates bonded together strongly. All four of the laminates made in the equipment were smooth, glossy, flat, and fairly uniform in thickness. Glass fibers in the mat were well hidden from view by the top sheet of pigmented rubber-plasticized polystyrene.

EXAMPLE IV

A ten inch by ten inch sheet of polystyrene impregnated glass-fiber mat, made according to Example I, was laminated between two ten inch by ten inch by 0.025 inch sheets of polystyrene modified with 15% by weight of GRS-5 rubber. A similar laminate was made up using sheets of polystyrene modified with 22% by weight of GRS-5 rubber. Both laminates, individually, were preheated for ten minutes at about 175° C. and then a pressure of 150 pounds per square inch was applied for five minutes in a "Hydrolair" press, after which the press platens were cooled to room temperature while maintaining a platen pressure of 150 pounds per square inch.

The formulations flowed more readily under pressure than those using the rubber-modified polystyrene of Example I. The resulting laminates were flat, smooth and glossy in appearance, and the various components of the laminates bonded together strongly.

EXAMPLE V

Four laminates, varying in the number, combination, and thickness as noted of the sheets of materials used, were made up using the emulsion polymerized polystyrene mat and the rubber-modified polystyrene of Example I. For comparison, two laminates were made up using only the emulsion polymerized polystyrene of Example I. The method and procedure for lamination was the same as that of Example I. The various laminates were then tested for physical properties, using standard laboratory tests as noted. The results of these tests are given in the form of a table and the composition of the various laminates is given first.

Laminate A consisted of two sheets, each 0.025 inch in thickness, of the rubber-modified polystyrene of Example I separated by a sheet of the polystyrene impregnated glass-fiber mat of Example I. Laminate B consisted of three sheets, each 0.025 inch thick, of rubber-modified polystyrene separated by two sheets of the impregnated mat. Laminate C had two sheets of impregnated mat separated by one sheet of rubber-modified polystyrene 0.006 inch in thickness and covered on each side by a sheet of rubber-modified polystyrene which was 0.025 inch in thickness. Laminate D consisted of three alternate layers each of the rubber-modified polystyrene and the polystyrene impregnated mat. Laminate E consisted of two sheets and laminate F of four sheets of the emulsion polymerized polystyrene impregnated mat.

The test results are contained in the following table:

| Physical Properties | A | B | C | D | E | F |
|---|---|---|---|---|---|---|
| Laminate thickness, inches | .091 | .147 | .128 | 1.85 | .076 | .168 |
| Weight Ratio of Impregnated Glass-Fiber Mat to Rubber-Modified Sheet | 1.063 | 1.585 | 2.11 | 2.375 | | |
| Flexural Strength, p. s. i | 12,300 | 18,200 | 16,400 | 20,100 | 26,100 | 31,900 |
| Flexural Modulus, × 10⁻³, p. s. i | 325 | 569 | 493 | 751 | 1,050 | 1,280 |
| Tensile Strength, p. s. i | 10,100 | 11,100 | 12,700 | 13,000 | 16,900 | 18,400 |
| Tensile Modulus × 10⁻³, p. s. i | 744 | 709 | 785 | 893 | 1,380 | 949 |
| Tensile Elongation, Percent | 1.91 | 1.82 | 2.08 | 2.04 | 1.78 | 2.14 |
| Izod Impact Strength on Laminate Edge, ft-lb./in. of notch at— | | | | | | |
| 23° C | 6.81 | 8.53 | 9.37 | 8.67 | 12.0 | 10.8 |
| −25° C | 5.96 | | | 8.32 | | |
| −40° C | 6.64 | | | 8.98 | | |
| −60° C | 8.82 | 7.52 | 9.33 | 7.09 | 15.0 | 14.9 |
| −75° C | 7.43 | 12.0 | 12.4 | 6.61 | 20.3 | 15.7 |
| −100° C | 9.17 | 11.2 | 11.6 | 8.08 | 17.6 | 16.1 |
| Charpy Impact Strength ² on Laminate Surface in ft-lb./in. of depth at— | | | | | | |
| 23° C | 6.75 | 6.26 | 5.88 | 6.94 | 2.58 | 8.37 |
| −25° C | 4.63 | | | 7.14 | | |
| −40° C | | 5.42 | 4.72 | | 2.83 | 8.58 |
| −100° C | | 4.46 | 4.53 | | 3.34 | 10.50 |
| Charpy Impact on Laminate Edge, ft-lb./in. of depth at— | | | | | | |
| 23° C | (¹) | 14.6 | 15.5 | 15.4 | 16.6 | 19.7 |
| −25° C | (¹) | | | 14.7 | | |
| −40° C | | 13.0 | 13.5 | | 20.3 | 21.3 |
| −100° C | | 17.2 | 13.0 | | 22.4 | 24.7 |
| ASTM Heat Distortion Temperature, °C | 106.8 | 111.5 | 110.5 | 108.8 | 110.8 | 113.5 |

¹ Specimens bounced out of place when hit by hammers.
² Specimens were bent and pushed through the supports at the indicated values.

EXAMPLE VI

This example shows the high resistance to heat distortion of the laminated material as compared to the rubber-modified sheet. For this purpose, a laminate was made consisting of a 2.5 inch by 2.5 inch sheet of polystyrene impregnated glass-fiber, made according to Example I, between two sheets of 2.5 inch by 2.5 inch by 0.025 inch rubber-modified polystyrene, made according to Example I. Separate samples of this laminate were then heated to various degrees of temperature and measured for distortion. For comparison, 2.5 inch by 2.5 inch sheets of two thicknesses of the rubber-modified polystyrene made in the manner of Example I were also heated to the same temperatures and measured for heat distortion. Measurements were taken along one 2.5 inch side of each sample. All samples measured 2.5 inches by 2.5 inches at 23° C. before heating.

The results of the tests are given in the following table:

*Percent shrinkage*

DISTORTION AT INDICATED TEMPERATURES

| Material | 100° C. | 120° C. | 139° C. | 175° C. |
|---|---|---|---|---|
| | Percent | Percent | Percent | Percent |
| Laminate of Invention | 0 | 0 | 0 | 0 |
| Rubber-Modified Sheet of 0.100 inch thickness | 5 | 8.75 | 25 | 22.5 |
| Rubber-Modified Sheet of 0.020 inch thickness | 1.25 | 10 | 37.5 | 42.1 |

EXAMPLE VII

Three squares of rubber-plasticized styrene-acrylonitrile copolymer measuring 8 inches by 8 inches by 0.23 inch were separated by two sheets of glass-fiber mat impregnated with styrene-acrylonitrile copolymer and then laminated.

The rubber-modified sheet was made by first preparing an emulsion of styrene-acrylonitrile by emulsifying 70 parts styrene and 30 parts acrylonitrile and polymerizing the mixture to obtain an emulsion with 40% solids. 200 parts of the emulsion were then mixed with 36.4 parts of "Chemigum" 200 (70 parts butadiene, 30 parts acrylonitrile) latex (55.0% solids) and the two were coprecipitated. The mixture was then roll-milled to get intimate mixing of the rubber and styrene-acrylonitrile after which portions of the milled batch were pressed to a 0.23 inch thick sheet.

The polystyrene impregnated mat was prepared in the following manner. A sheet of glass-fiber mat consisting of glass fibers bonded together by about 5% by weight of polystyrene and weighing 2 ounces per square foot was impregnated with 7.5 ounces of emulsion polymerized styrene-acrylonitrile (40 percent by weight), and then dried at 150° C. for 45 minutes. The emulsion polymerized styrene-acrylonitrile copolymer, which had an intrinsic viscosity of 1.28, was prepared in the conventional manner by emulsifying 70 parts of styrene and 30 parts of acrylonitrile in water and polymerizing the mixture.

This composite was bonded on a press as follows. It was preheated to a platen temperature of 165 to 180° C. for 10 minutes, 400 p. s. i. platen pressure was applied for 5 minutes, and afterwards, the platens were cooled to room temperature while the platen pressure was maintained at 400 p. s. i.

The rubber-plasticized sheet adhered well to the impregnated mat and hid the glass fiber in the mat from view. The surface of the laminate was smooth and glossy, the laminate was flat, and its thickness was about the same across the piece indicating that all voids had been easily filled.

Physical properties determined on this laminate are listed below:

| | |
|---|---|
| Tensile strength, p. s. i. | 13,300 |
| Tensile elongation, % | 2.0 |
| Flexural strength, p. s. i. | 19,400 |
| Flexural modulus, p. s. i. | 660,000 |
| Charpy impact strength at: | |
| 23° C. ft. lb./in. of width | 13.7 |
| −100° C. ft. lb./in. of notch | 9.68 |
| ASTM heat distortion temperature ° C. | 116 |

We claim:

1. A laminate of uniform density having high flexural and impact strengths and a high heat distortion temperature comprising alternate layers of at least one hard and solid sheet of glass fibers impregnated with between 50 and 85 percent by weight of at least one polymer selected from the group consisting of emulsion-polymerized styrene homopolymer and emulsion-polymerized styrene-acrylonitrile copolymer, said hard and solid sheet being laminated to at least two sheets of a synthetic rubber-modified styrene polymer comprising an emulsion-polymerized styrene polymer modified by the addition of a synthetic rubber selected from the group consisting of rubbery copolymers of styrene and butadiene and rubbery copolymers of butadiene and acrylonitrile, the total percentage of polymerized styrene in said rubber-modified styrene polymer sheets being between 70 and 95 percent by weight.

2. A laminate according to claim 1 wherein said sheet of glass fibers is impregnated with emulsion-polymerized styrene homopolymer.

3. A laminate according to claim 1 wherein said sheet of glass fibers is impregnated with emulsion-polymerized styrene-acrylonitrile copolymer.

4. A laminate according to claim 1 wherein said sheet of glass fibers is impregnated with emulsion-polymerized styrene-acrylonitrile copolymer, said styrene-acrylonitrile copolymer consisting of from 50 to 85 percent by weight of styrene and the balance acrylonitrile.

5. A laminate of uniform density having high flexural and impact strengths and a high heat distortion temperature comprising alternate layers of at least one hard and solid sheet of glass fibers impregnated with between 60 and 70 percent by weight of at least one polymer selected from the group consisting of emulsion-polymerized styrene homopolymer and emulsion-polymerized styrene-acrylonitrile copolymer, said hard and solid sheet being laminated to at least two sheets of a synthetic rubber-modified styrene polymer comprising an emulsion-polymerized styrene polymer modified by the addition of a synthetic rubber selected from the group consisting of rubbery copolymers of styrene and butadiene and rubbery copolymers of butadiene and acrylonitrile, the total percentage of polymerized styrene in said rubber-modified styrene polymer sheets being between 70 and 95 percent by weight.

6. A laminate according to claim 5 wherein said sheet of glass fibers is impregnated with emulsion-polymerized styrene homopolymer.

7. A laminate according to claim 5 wherein said sheet of glass fibers is impregnated with emulsion-polymerized styrene-acrylonitrile copolymer.

8. A laminate according to claim 5 wherein said sheet of glass fibers is impregnated with emulsion-polymerized styrene-acrylonitrile copolymer, said styrene-acrylonitrile copolymer consisting of from 50 to 85 percent by weight of styrene and the balance acrylonitrile.

9. A laminate according to claim 1 wherein said synthetic rubber is an emulsion-polymerized rubbery copolymer of styrene and butadiene.

10. A laminate according to claim 1 wherein said synthetic rubber is an emulsion-polymerized rubbery copolymer of styrene and butadiene, said rubbery copolymer consisting of 30 percent by weight of styrene and the balance butadiene.

11. A laminate according to claim 1 wherein said synthetic rubber is an emulsion-polymerized rubbery copolymer of butadiene and acrylonitrile.

12. A laminate of uniform density having high flexural and impact strengths and a high heat distortion temperature comprising alternate layers of at least one hard and solid sheet of glass fibers impregnated with between 50 and 85 percent by weight of at least one polymer selected from the group consisting of emulsion-polymerized styrene homopolymer and emulsion-polymerized styrene-acrylonitrile copolymer, said hard and solid sheet being laminated to at least two sheets of a synthetic rubber-modified styrene polymer comprising an emulsion-polymerized styrene-acrylonitrile copolymer modified by the addition of a synthetic rubber selected from the group consisting of rubbery copolymers of styrene and butadiene and rubbery copolymers of butadiene and acrylonitrile, the total percentage of polymerized styrene in said rubber-modified styrene polymer sheets being between 70 and 95 percent by weight.

13. A laminate according to claim 12 wherein said synthetic rubber is an emulsion-polymerized rubbery copolymer of styrene and butadiene.

14. A laminate according to claim 12 wherein said synthetic rubber is an emulsion-polymerized rubbery copolymer of styrene and butadiene, said rubbery copolymer consisting of 30 percent by weight of styrene and the balance butadiene.

15. A laminate according to claim 12 wherein said synthetic rubber is an emulsion-polymerized rubbery copolymer of butadiene and acrylonitrile.

References Cited in the file of this patent

UNITED STATES PATENTS

| | | |
|---|---|---|
| 1,777,309 | Hopkinson | Oct. 7, 1930 |
| 2,135,057 | Slayter et al. | Nov. 1, 1938 |
| 2,311,613 | Slayter | Feb. 16, 1943 |
| 2,414,803 | D' Alelio | Jan. 28, 1947 |
| 2,498,652 | Daly | Feb. 28, 1950 |
| 2,499,724 | Compton | Mar. 7, 1950 |
| 2,540,996 | Ryden | Feb. 6, 1951 |
| 2,566,960 | Philipps | Sept. 4, 1951 |
| 2,681,898 | Daly | June 22, 1954 |

UNITED STATES PATENT OFFICE

CERTIFICATE OF CORRECTION

Patent No. 2,805,181   September 3, 1957

Frazier Groff et al.

It is hereby certified that error appears in the printed specification of the above numbered patent requiring correction and that the said Letters Patent should read as corrected below.

Column 6, line 38, EXAMPLE V, for "shet" read -- sheet --; columns 5 and 6, in the table, fifth column thereof, under the heading "D", line 1, for "1.85" read -- .185 --.

Signed and sealed this 22nd day of October 1957.

(SEAL)
Attest:

KARL H. AXLINE
Attesting Officer

ROBERT C. WATSON
Commissioner of Patents